(12) United States Patent
Min et al.

(10) Patent No.: US 10,455,125 B2
(45) Date of Patent: Oct. 22, 2019

(54) IMAGE PROCESSING METHOD AND DEVICE

(71) Applicant: SAMSUNG ELECTRONICS CO., LTD., Suwon-si (KR)

(72) Inventors: Byung-seok Min, Seoul (KR); Jong-man Kim, Gunpo-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/562,477

(22) PCT Filed: Mar. 30, 2016

(86) PCT No.: PCT/KR2016/003244
§ 371 (c)(1),
(2) Date: Sep. 28, 2017

(87) PCT Pub. No.: WO2016/159647
PCT Pub. Date: Oct. 6, 2016

(65) Prior Publication Data
US 2018/0146120 A1    May 24, 2018

Related U.S. Application Data

(60) Provisional application No. 62/141,375, filed on Apr. 1, 2015.

(51) Int. Cl.
*H04N 1/60*    (2006.01)
*G06T 1/00*    (2006.01)
(Continued)

(52) U.S. Cl.
CPC ............. *H04N 1/6061* (2013.01); *G06T 1/00* (2013.01); *G09G 5/02* (2013.01); *H04N 1/46* (2013.01);
(Continued)

(58) Field of Classification Search
CPC ...... H04N 1/6061; H04N 1/6008; G06T 1/00; G09G 2320/0242; G09G 2340/06
See application file for complete search history.

(56) References Cited

U.S. PATENT DOCUMENTS 8,963,945 B2    2/2015  Kim et al.
2006/0262224 A1  11/2006  Ha et al.
(Continued)

FOREIGN PATENT DOCUMENTS

EP    2 482 559 B1    3/2018
JP    2013-505623 A    2/2013
(Continued)

OTHER PUBLICATIONS

Jose-Luis Lisani, et al., "Color and Contrast Enhancement by Controlled Piecewise Affine Histogram Equalization", Published in Image Processing On Line on Oct. 17, 2012. pp. 244-246. (Year: 2012).*

(Continued)

*Primary Examiner* — Chong Wu
(74) *Attorney, Agent, or Firm* — Sughrue Mion, PLLC

(57) ABSTRACT

An image processing method includes obtaining color information of each of a plurality of pixels included in an input image signal; determining whether a color value of each of the plurality of pixels corresponds to a gamut boundary of the input image signal based on the obtained color information; determining a gain value for allowing the color value of at least one of the plurality of pixels to correspond to the gamut boundary, based on a result of the determining; and converting the color value of the at least one pixel based on the determined gain value.

13 Claims, 11 Drawing Sheets

(51) Int. Cl.
*H04N 1/46* (2006.01)
*G09G 5/02* (2006.01)

(52) U.S. Cl.
CPC ............ *H04N 1/60* (2013.01); *H04N 1/6008* (2013.01); *G09G 2320/0242* (2013.01); *G09G 2340/06* (2013.01); *G09G 2360/16* (2013.01)

(56) References Cited

U.S. PATENT DOCUMENTS

| 2008/0068626 | A1* | 3/2008 | Bala ..................... H04N 1/6058 358/1.9 |
| 2008/0252757 | A1 | 10/2008 | Lee et al. |
| 2009/0141971 | A1* | 6/2009 | Pan ...................... H04N 1/6058 382/162 |
| 2010/0157154 | A1 | 6/2010 | Kobayashi et al. |
| 2013/0050245 | A1 | 2/2013 | Longhurst et al. |

FOREIGN PATENT DOCUMENTS

| WO | 2008072162 A2 | 6/2008 |
| WO | 2011034366 A2 | 3/2011 |

OTHER PUBLICATIONS

International Search Report, issued by International Searching Authority in corresponding International Application No. PCT/KR2016/003244, dated Jul. 6, 2016. (PCT/ISA/210).
Written Opinion issued by the International Bureau in corresponding International Application No. PCT/KR2016/003244, dated Jul. 6, 2016. (PCT/ISA/237).
Communication dated Sep. 1, 2018 issued by the Korean in Office in counterpart Korean Application No. 10-2017-7026962.
Communication dated Dec. 26, 2018, issued by the Korean Intellectual Property Office in counterpart Korean Patent Application No. 10-2017-7026962.

* cited by examiner

IMAGE PROCESSING METHOD AND DEVICE

TECHNICAL FIELD

The present disclosure relates to an image processing method, an image processing apparatus, and a recording medium having recorded thereon the image processing method.

BACKGROUND ART

Images produced for broadcast in movie studios or broadcasting stations have a narrow color gamut optimized for a sRGB panel corresponding to the BT 709 standard. On the other hand, with the recent development of IT technology, demand of users for higher quality images are increasing. Accordingly, research into techniques for expanding a color gamut of an image has been actively conducted.

However, the existing technology has a problem in that distortion occurs in color conversion due to the color gamut of the image expanding all at once or mapping of a color of the image based on a fixed mapping table to expand the color gamut. Therefore, it is necessary to develop a technique for minimizing color distortion while expanding the color gamut of the image.

DETAILED DESCRIPTION OF THE INVENTION

Technical Problem

The present disclosure provides an image processing method and an image processing apparatus for converting a color of an input image signal by minimizing distortion of the color in consideration of characteristics of the input image signal.

Technical Solution

According to an embodiment of the present disclosure, an image processing method includes obtaining color information of each of a plurality of pixels included in an input image signal; determining whether a color value of each of the plurality of pixels corresponds to a gamut boundary of the input image signal based on the obtained color information; determining a gain value for allowing the color value of at least one of the plurality of pixels to correspond to the gamut boundary, based on a result of the determining; and converting the color value of the at least one pixel based on the determined gain value.

Advantageous Effects

According to the embodiments, an image processing apparatus may provide a higher quality image by expanding a color of an input image signal to a color gamut boundary in consideration of characteristics of the input image signal.

MODE OF THE INVENTION

Figure 1:
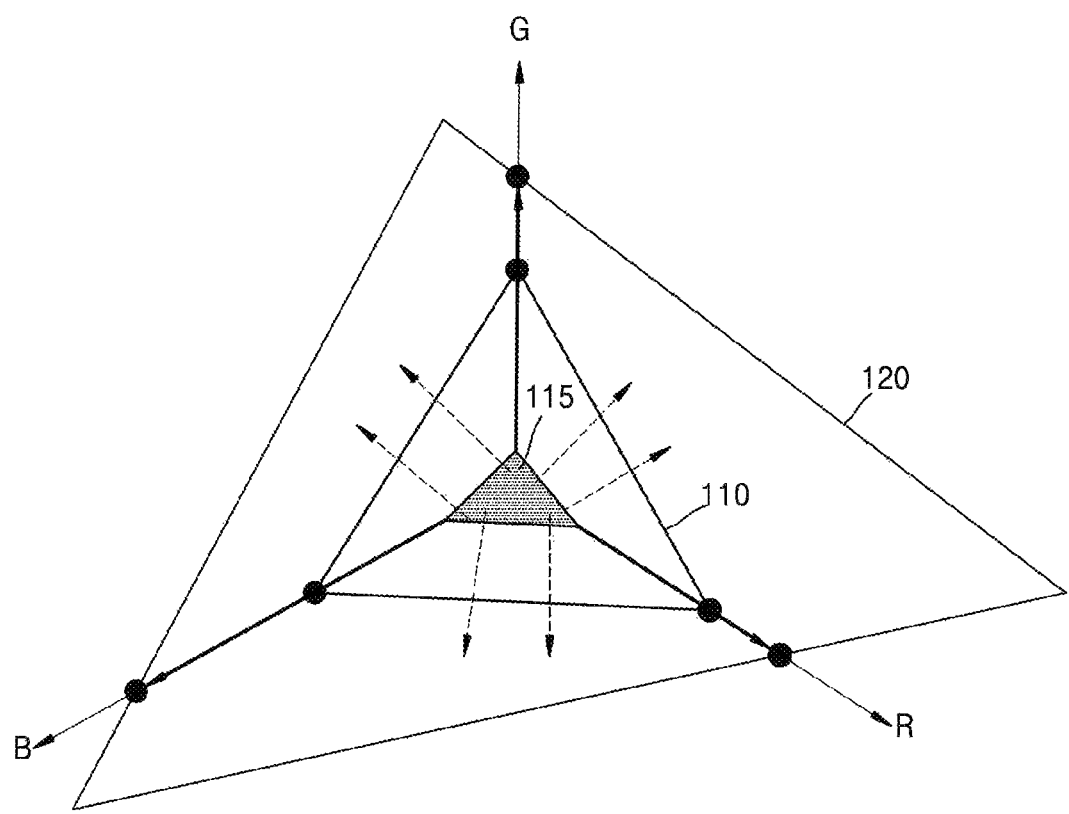
FIG. 1 is a conceptual diagram for explaining an image processing method according to an embodiment.

In order to accomplish the above object, a representative configuration of the present disclosure is as follows.

According to an embodiment of the present disclosure, an image processing method includes obtaining color information of each of a plurality of pixels included in an input image signal; determining whether a color value of each of the plurality of pixels corresponds to a gamut boundary of the input image signal based on the obtained color information; determining a gain value for allowing the color value of at least one of the plurality of pixels to correspond to the gamut boundary, based on a result of the determining; and converting the color value of the at least one pixel based on the determined gain value.

The image processing method may further include: selecting at least one pixel having a preset preservation color from the plurality of pixels based on the obtained color information, wherein the determining of the gain value includes: determining the gain value for allowing the color value of the at least one pixel except for the at least one selected pixel among the plurality of pixels to correspond to the gamut boundary.

The determining of the gain value may include: determining a gain value of the at least one selected pixel as a preset threshold value.

The image processing method may further include: classifying the plurality of pixels into at least one group based on a preset color value with respect to the input image signal, wherein the determining of the gain value includes: determining the gain value with respect to each of the at least one group based on the color information of the pixels included in the at least one classified group.

The determining of the gain value may include: determining a lowest gain value among the gain values of the pixels included in each of the at least one classified group as a gain value of each of the at least one group.

The determining of the gain value may include: determining a color distribution of pixels included in each of the at least one group based on color information of pixels included in each of the at least one classified group; and, based on the determined color distribution, when the number of pixels having the first color is less than a predetermined number, determining a gain value of each of the at least one group based on color information of pixels except for a pixel having the first color of the plurality of pixels.

The image processing method may further include: selecting the pixels included in a preset region from the input image signal, wherein the determining of the gain value includes: determining the gain value for allowing the color value of each of the selected pixels to correspond to the gamut boundary based on the color information of the selected pixels.

The determining of the gain value may include: determining the gain value of the at least one pixel based on a predetermined gain value with respect to at least one pixel included in a previously obtained input image signal.

The image processing method may further include: detecting a preset object from the input image signal; and selecting a pixel corresponding to a position of the detected preset object, wherein the determining of the gain value includes: determining the gain value for allowing the color value of the at least one pixel except for the selected pixel among the plurality of pixels to correspond to the gamut boundary.

According to another embodiment of the present disclosure, an image processing apparatus includes: a color information obtainer configured to obtain color information of each of a plurality of pixels included in an input image signal; and a processor configured to determine whether a color value of each of the plurality of pixels corresponds to a gamut boundary of the input image signal based on the obtained color information, determine a gain value for allowing the color value of at least one of the plurality of pixels to correspond to the gamut boundary, based on a result of the determining, and convert the color value of the at least one pixel based on the determined gain value.

The processor may be further configured to select at least one pixel having a preset preservation color from the plurality of pixels based on the obtained color information, and determine the gain value for allowing the color value of the at least one pixel except for the at least one selected pixel among the plurality of pixels to correspond to the gamut boundary.

The processor may be further configured to determine a gain value of the at least one selected pixel as a preset threshold value.

The processor may be further configured to classify the plurality of pixels into at least one group based on a preset color value with respect to the input image signal, and determine the gain value with respect to each of the at least one group based on the color information of the pixels included in the at least one classified group.

The processor may be configured to determine a lowest gain value among the gain values of the pixels included in each of the at least one classified group as a gain value of each of the at least one group.

The processor may be configured to determine a color distribution of pixels included in each of the at least one group based on color information of pixels included in each of the at least one classified group; and, based on the determined color distribution, when the number of pixels having the first color is less than a predetermined number, determine a gain value of each of the at least one group based on color information of pixels except for a pixel having the first color of the plurality of pixels.

The processor may be further configured to select the pixels included in a preset region from the input image signal, and determine the gain value for allowing the color value of each of the selected pixels to correspond to the gamut boundary based on the color information of the selected pixels.

The processor may be further configured to determine the gain value of the at least one pixel based on a predetermined gain value with respect to at least one pixel included in a previously obtained input image signal.

The image processing apparatus may further include: an object detector configured to detect a preset object from the input image signal, wherein the processor is further configured to select a pixel corresponding to a position of the detected preset object, and determine the gain value for allowing the color value of the at least one pixel except for the selected pixel among the plurality of pixels to correspond to the gamut boundary.

Terms used in this specification will now be briefly described before describing the present disclosure.

Although most terms used in this specification are selected among currently popular general terms in consideration of functions implemented in the present disclosure, some terms are used based on the intentions of those of ordinary skill in the art, precedents, emergence of new technologies, or the like. Specific terms may be arbitrarily selected by the applicant and, in this case, the meanings thereof will be described in the detailed description of the disclosure. Thus, the terms used herein should be defined based on practical meanings thereof and the whole content of this specification, rather than based on names of the terms.

It will be understood that the terms "comprises", "comprising", "includes" and/or "including", when used herein, specify the presence of stated elements, but do not preclude the presence or addition of one or more other elements. The suffix such as " . . . er", "unit", or "module" is used to denote an entity for performing at least one function or operation, and may be embodied in the form of hardware, software, or a combination thereof.

Hereinafter, embodiments of the present disclosure will be described in detail with reference to the accompanying drawings so that those skilled in the art may easily carry out the present disclosure. The present disclosure may, however, be embodied in many different forms and should not be construed as limited to the embodiments set forth herein. In order to clearly illustrate the present disclosure, parts not related to the description of the present disclosure are omitted, and like parts are denoted by like reference numerals throughout the specification.

FIG. 1 is a conceptual diagram for explaining an image processing method according to an embodiment.

The image processing apparatus according to an embodiment may obtain color information of each of a plurality of pixels included in an input image signal. Here, the color information may include information on at least one of color, hue, saturation, and chrominance (Cb, Cr) according to a color space in which the input image signal is defined. However, this is only an embodiment, and the color information may be determined according to the color space in which the input image signal is defined.

For example, the image processing apparatus may obtain an RGB (Red Green Blue) value 110 of each of the plurality of pixels included in the input image signal. Referring to FIG. 1, the obtained RGB value 110 of each of the plurality of pixels included in the image processing apparatus may be displayed in coordinates on the color space. However, this is only an embodiment, and the color information of the input image signal that may be processed by the image processing apparatus is not limited thereto. According to another example, the image processing apparatus may acquire the color information of the input image signal defined in the color space such as a luminance chroma hue (YCH), a lightness chroma hue (LCH), a hue saturation value (HSV), etc.

The image processing apparatus according to an embodiment may determine whether a color value of each of the plurality of pixels corresponds to a gamut boundary 120 of the input image signal based on the color information of each of the plurality of pixels included in the input image signal. Here, the gamut boundary 120 of the input image signal may represent a boundary region of reproducible colors on the color space in which the input image signal is defined. For example, when the input image signal is defined in an RGB color space, the gamut boundary 120 may be defined as 0 to 255 for each component of RGB.

The image processing apparatus according to an embodiment may select pixels having no color value corresponding to the gamut boundary 120 among the plurality of pixels included in the input image signal. The image processing apparatus may determine a gain value for allowing a color value of each of the selected pixels to correspond to the gamut boundary 120.

The image processing apparatus according to an embodiment may convert the color value of at least one of the plurality of pixels included in the input image signal based on the determined gain value. For example, the image processing apparatus may perform a multiplication operation on the color value of at least one pixel and a gain value G to convert the color of the at least one pixel.

Meanwhile, in order to maintain a color value 115 of at least one pixel having a specific color among the plurality of pixels included in the input image signal, the image processing apparatus according to an embodiment may select at least one pixel having a specific color among the plurality of pixels based on the obtained color information. Hereinafter, a specific color of a pixel for which the image processing apparatus wants to maintain is described as a preservation color for convenience of explanation.

In order to maintain the color value 115 of the pixel having the preservation color, the image processing apparatus according to an embodiment may convert only color values of the pixels except for the pixels having the preservation color among the plurality of pixels included in the input image signal. According to another embodiment, the image processing apparatus may determine a gain value of the pixels having the preservation color as a predetermined threshold value. However, this is only an embodiment, and according to another embodiment, the image processing apparatus may determine the gain value of the pixels having the preservation color to be less than a predetermined threshold range.

The image processing apparatus according to an embodiment may convert the color value of each of the plurality of pixels included in the input image signal so as to match a gamut boundary of an input image signal, thereby providing a user with an image of improved image quality. Further, the image processing apparatus may restrict conversion of a color value corresponding to the preservation color among a color of the input image signal, thereby providing the user with a more natural image.

Figure 2:
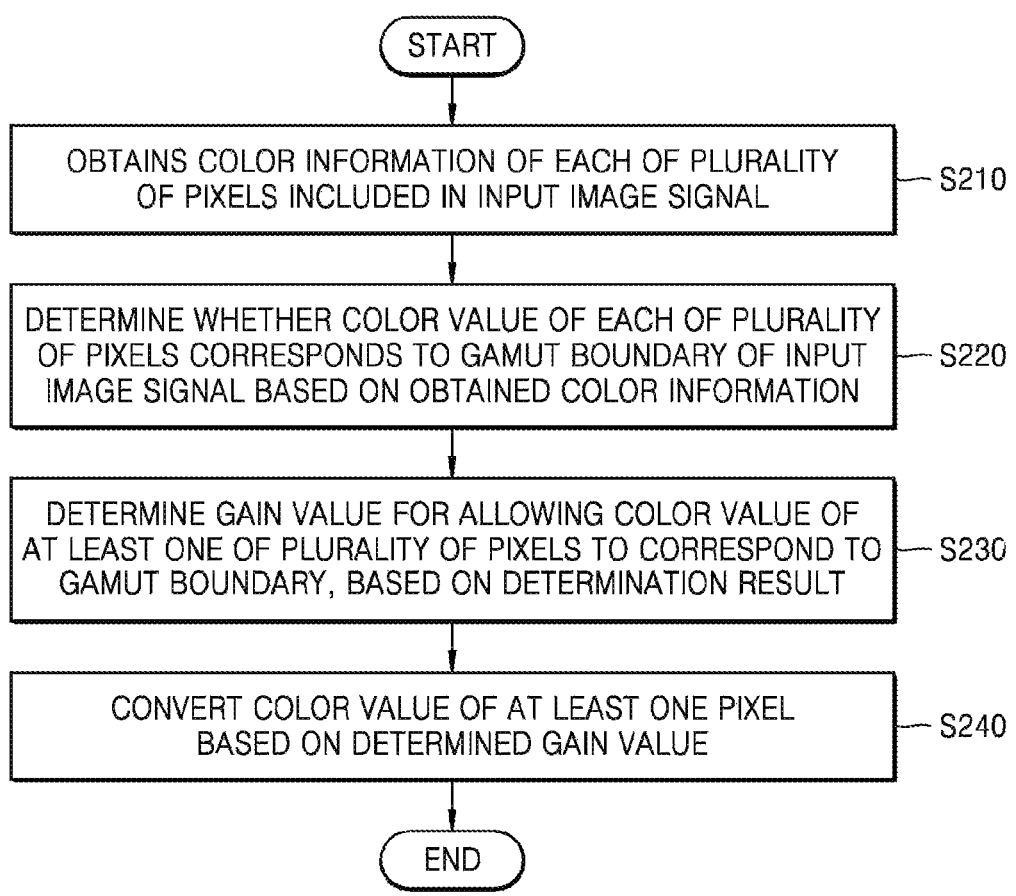
FIG. 2 is a flowchart illustrating an image processing method according to an embodiment.

FIG. 2 is a flowchart illustrating an image processing method according to an embodiment.

In step S210, the image processing apparatus obtains color information of each of a plurality of pixels included in an input image signal.

For example, the image processing apparatus may obtain the color information on at least one of color, hue, saturation, and chrominance (Cb, Cr) of each of the plurality of pixels included in the input image signal. However, this is only an embodiment, and the color information in the disclosed embodiment is not limited to the above example.

In step S220, the image processing apparatus determines whether a color value of each of the plurality of pixels corresponds to a gamut boundary of the input image signal based on the obtained color information.

Here, the gamut boundary of the input image signal represents a boundary of a reproducible color range in the color space in which the input image signal is defined. For example, when the input image signal is defined in a RGB color space, the gamut boundary of the input image signal may represent the boundary of the reproducible color range in the RGB color space. According to another example, when the input image signal is defined in an YCbCr color space, the gamut boundary of the input image signal may represent the boundary of the reproducible color range in a CbCr color space.

However, this is merely an embodiment, and, according to another embodiment, the image processing apparatus may set the boundary of the reproducible color range in an output device from which the input image signal is output as the gamut boundary.

The image processing apparatus according to an embodiment may determine coordinates of each of the plurality of pixels on the color space based on the obtained color information. For example, the image processing apparatus may determine the coordinates of each of the plurality of pixels on the RGB color space. According to another example, the image processing apparatus may determine the coordinates in the CbCr color space of each of the plurality of pixels.

The image processing apparatus according to an embodiment may determine whether the color value of each of the plurality of pixels corresponds to the gamut boundary as the coordinates in the color space of each of the plurality of pixels are determined. For example, the image processing apparatus may determine whether the coordinates in the color space of each of the plurality of pixels are located on the gamut boundary, and determine whether the color value of each of the plurality of pixels corresponds to the gamut boundary.

In step S230, the image processing apparatus determines a gain value for allowing the color value of at least one of the plurality of pixels to correspond to the gamut boundary, based on a determination result.

The image processing apparatus according to an embodiment may select at least one pixel having a color value not corresponding to the gamut boundary among the plurality of pixels. The image processing apparatus may also determine, on the color space, a gain value that is multiplied with the coordinates of the selected pixel so that the coordinates of the selected pixel may be located on the gamut boundary.

Meanwhile, the image processing apparatus according to an embodiment may classify the plurality of pixels into at least one group according to a predetermined color value. Here, the color value may represent any one of color, saturation, hue, and chrominance (cb, cr).

The image processing apparatus according to an embodiment may determine a gain value for each classified group. For example, when the n image processing apparatus classifies the plurality of pixels according to eight chrominance values, the image processing apparatus may determine a gain value for each of the eight classified groups. Here, the image processing apparatus may determine a smallest gain value among gain values of the pixels included in the group as a gain value of the group. However, this is only an embodiment, and a method by which the image processing apparatus determines the gain value for each group is not limited thereto. The method by which the image processing apparatus determines the gain value for each classified group will be described later in more detail with reference to FIGS. 6 to 8.

In step S240, the image processing apparatus converts the color value of the at least one pixel based on the determined gain value.

The image processing apparatus according to an embodiment may convert a color value of the at least one pixel by multiplying the determined gain value by color information of the at least one pixel. According to another embodiment, when the image processing apparatus determines the gain value for each group, the image processing apparatus may convert a color value of each of pixels for a specific group by multiplying color information of each of the pixels included in the group by the gain value determined for the specific group.

Meanwhile, according to another embodiment, the image processing apparatus may maintain colors of some of the plurality of pixels included in the input image signal. According to another embodiment, the image processing apparatus may limit gain values of some of the plurality of pixels included in the input image signal such that gain values of colors of some pixels are less than a threshold range or correspond to a threshold value. Here, some pixels may be pixels having a predetermined preservation color in the image processing apparatus. Further, some pixels may be pixels located in a region where a predetermined object is displayed in the image processing apparatus.

Figure 3:
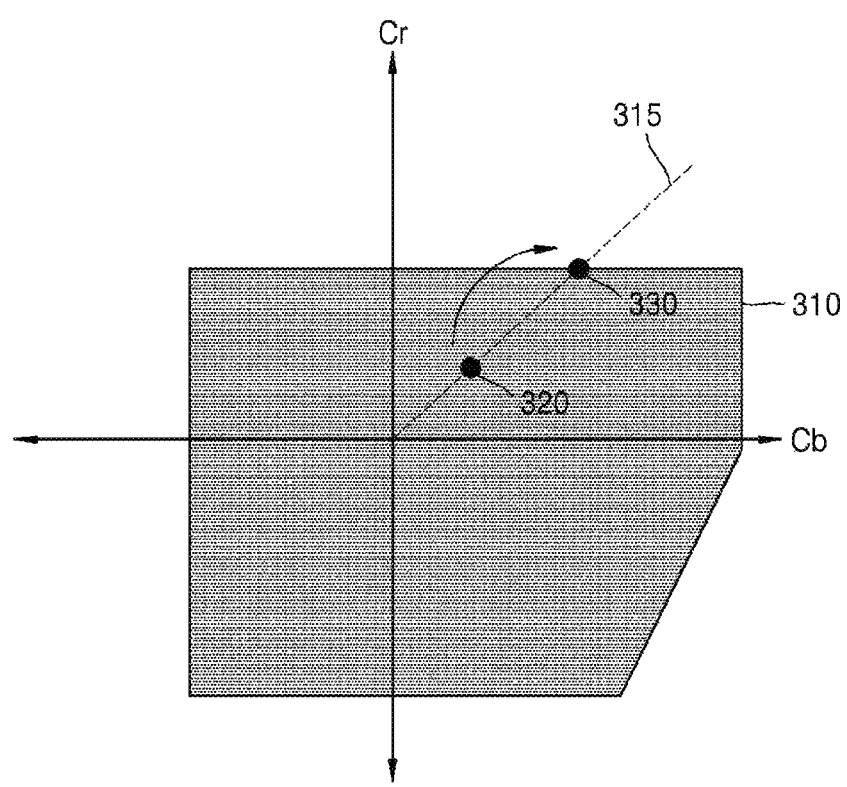
FIG. 3 is a diagram for explaining a method by which an image processing apparatus determines a gain value of a pixel included in an input image signal, according to an embodiment.

FIG. 3 is a diagram for explaining a method by which an image processing apparatus determines a gain value of a pixel included in an input image signal according to an embodiment.

Referring to FIG. 3, the image processing apparatus according to an embodiment may display a color component of each of a plurality of pixels included in an input image signal in coordinates on a two-dimensional chrominance space. In the two-dimensional chrominance space, a gamut boundary 310 may be determined according to a value that each of a Cb component and a Cr component may have.

The image processing apparatus according to an embodiment may determine whether a color value of a first pixel corresponds to the gamut boundary 310 based on color information of the first pixel, which is one of the plurality of pixels included in the input image signal. Here, when coordinates 320 on a color space of the first pixel are not located on the gamut boundary 310, the image processing apparatus may determine that the color value of the first pixel does not correspond to the gamut boundary 310.

The image processing apparatus according to an embodiment may determine a gain value for allowing the color value of the first pixel to correspond to the gamut boundary 310 based on the color information of the first pixel. For example, the image processing apparatus may determine the gain value for allowing coordinates 320 on the color space of the first pixel to move to coordinates 330 on a gamut boundary for a specific color 315.

The image processing apparatus according to an embodiment may convert the color of the first pixel by multiplying the determined gain value by the color information of the first pixel. The image processing apparatus may convert a color of at least one of the plurality of pixels included in the input image signal by performing the above-described process on the at least one pixel included in the input image signal.

Figure 4:
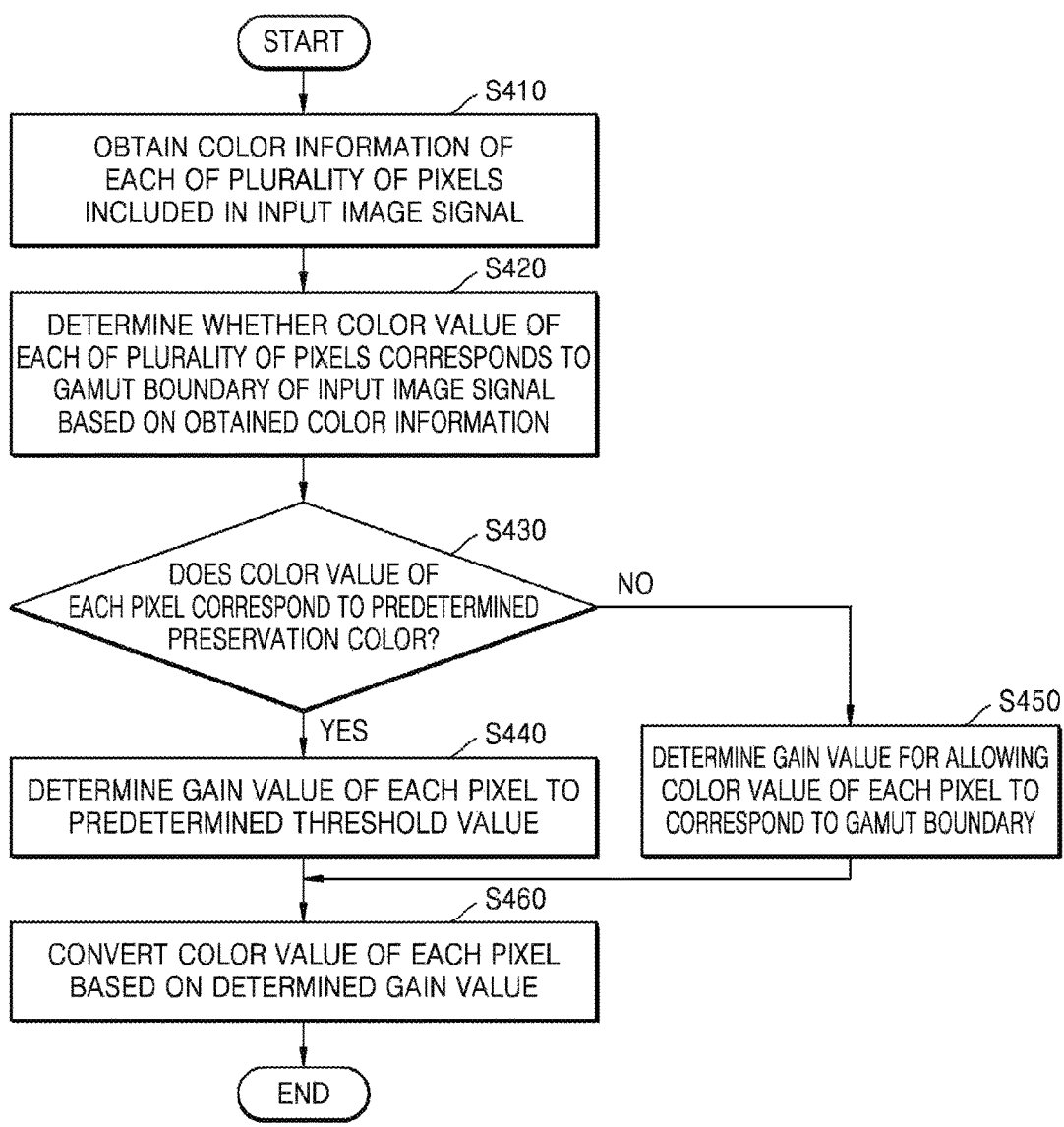
FIG. 4 is a flowchart illustrating a method by which an image processing apparatus determines a gain value when a pixel having a preservation color is included in a plurality of pixels included in an input image signal, according to an embodiment.

FIG. 4 is a flowchart illustrating a method by which an image processing apparatus determines a gain value when a pixel having a preservation color is included in a plurality of pixels included in an input image signal according to an embodiment.

In step S410, the image processing apparatus may obtain color information of each of the plurality of pixels included in the input image signal.

On the other hand, step S410 may correspond to step S210 described above with reference to FIG. 2.

In step S420, the image processing apparatus may determine whether a color value of each of the plurality of pixels corresponds to a gamut boundary of the input image signal based on the obtained color information.

The image processing apparatus according to an embodiment may represent the color value of each of the plurality of pixels in coordinates on a color space in which the input image signal is defined based on the obtained color information. The image processing apparatus may determine whether coordinates on the color space of each of the plurality of pixels are located on the gamut boundary, thereby determining whether the color value of each of the plurality of pixels corresponds to the gamut boundary of the input image signal.

In step S430, the image processing apparatus may determine whether the color value of each pixel corresponds to a predetermined preservation color.

The image processing apparatus according to an embodiment may determine whether the color value of each of the pixels having a color not corresponding to the gamut boundary corresponds to the predetermined preservation color.

The image processing apparatus according to an embodiment may previously set information on the preservation color. Here, the preservation color may include a color representing human skin (hereinafter, referred to as a flesh color for the sake of convenience), but this is merely an embodiment, and the preservation color according to the disclosed technical idea is not limited thereto.

The image processing apparatus according to an embodiment may determine whether the color value of each of the plurality of pixels corresponds to the predetermined preservation color, based on the color information of the plurality of pixels. For example, the image processing apparatus may determine whether the color value of each of the plurality of pixels corresponds to the flesh color, which is a boundary color between red and yellow on the color space.

However, this is only an embodiment, and the preservation color may be set to a color range. When the preservation color is set to the color range, the image processing apparatus may determine whether the color value of each pixel is included in the predetermined color range.

In step S440, the image processing apparatus may set a gain value of each pixel to a predetermined threshold value.

The image processing apparatus according to an embodiment may set the gain value of each pixel to the predetermined threshold value when the color value of each pixel corresponds to the preservation color. For example, when the color value of each pixel corresponds to the preservation color, the image processing apparatus may set the gain value to 1.1 in order to limit a conversion degree of the color of each pixel.

However, this is only an embodiment, and the image processing apparatus may set the gain value of a pixel having the color corresponding to the preservation color to be less than the predetermined threshold range. According to another embodiment, the image processing apparatus may set the gain value of the pixel having the color corresponding to the preservation color to 1, thereby maintaining the color of the pixel having the color corresponding to the preservation color.

In step S450, the image processing apparatus may determine a gain value for allowing the color value of each pixel to correspond to the gamut boundary.

The image processing apparatus according to an embodiment may determine the gain value for allowing a color value of a pixel having a color not corresponding to the preservation color to correspond to the gamut boundary. The image processing apparatus may determine the gain value for allowing coordinates on the color space of the pixel having the color not corresponding to the preservation color to correspond to the gamut boundary.

In step S460, the image processing apparatus may convert the color value of each pixel based on the determined gain value.

The image processing apparatus according to an embodiment may perform a multiplication operation on the color information of each of the plurality of pixels and the gain value determined for each of the plurality of pixels to convert the color of each of the plurality of pixels.

Figure 5:
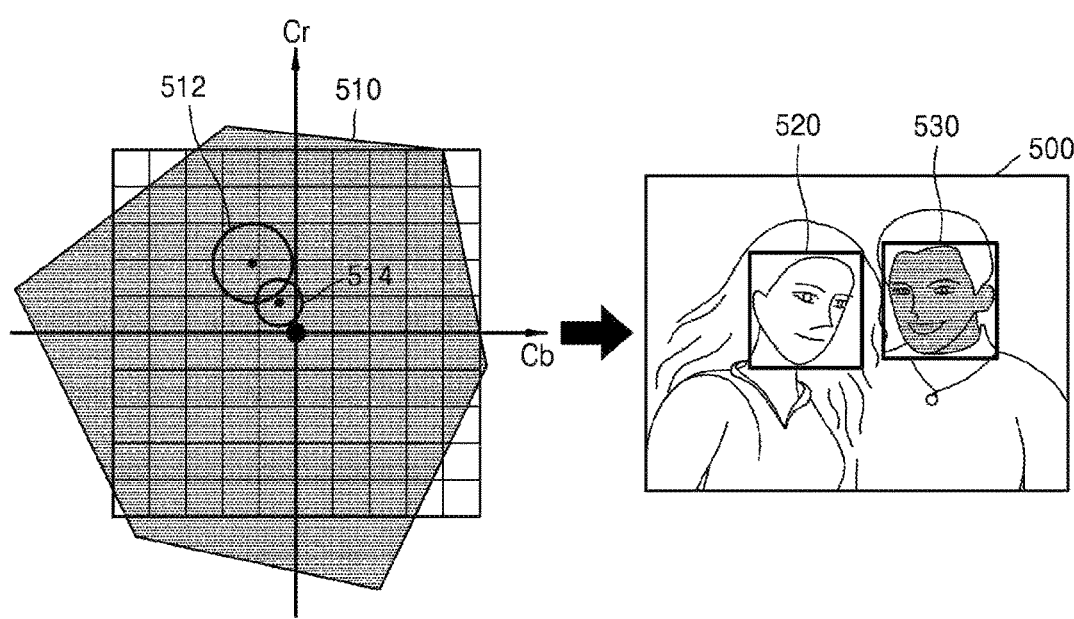
FIG. 5 is a diagram for explaining a method by which an image processing apparatus determines a gain value when a pixel having a preservation color is included in a plurality of pixels included in an input image signal, according to an embodiment.

FIG. 5 is a diagram for explaining a method by which an image processing apparatus determines a gain value when a pixel having a preservation color is included in a plurality of pixels included in an input image signal 500 according to an embodiment.

Referring to FIG. 5, the image processing apparatus may obtain color information of the input image signal 500. The image processing apparatus according to an embodiment may select at least one pixel having the preservation color among the plurality of pixels included in the input image signal 500 based on the obtained color information. Here, it is assumed that a first preservation color 512 and a second preservation color 514 are preset in the image processing apparatus. Further, in the embodiment of FIG. 5, the first preservation color 512 and the second preservation color 514 may be set as a color range.

The image processing apparatus according to an embodiment may select pixels 520 having a color corresponding to the first preservation color 512 among the plurality of pixels included in the input image signal 500. Also, the image processing apparatus may select pixels 530 having a color corresponding to the second preservation color 514 among the plurality of pixels included in the input image signal 500.

The image processing apparatus according to an embodiment may determine a gain value for allowing a color value of the pixel except for the selected pixels 520 and 530 among the plurality of pixels included in the input image signal 500 to correspond to a gamut boundary.

Further, the image processing apparatus may determine gain values of the selected pixels 520 and 530 as a predetermined threshold value. However, this is only an example, and the image processing apparatus may differently set the gain values of the pixels 520 having the color corresponding to the first preservation color 512 and the pixels 530 having the color corresponding to the second preservation color 514. Further, according to another embodiment, the image processing apparatus may determine the gain values of the selected pixels 520 and 530 as 1, and maintain the color values of the selected pixels 520 and 530. Further, according to another embodiment, the image processing apparatus may set the gain values of the selected pixels 520 and 530 to a value within a predetermined threshold range.

Meanwhile, in the embodiment described with reference to FIG. 5, the method by which the image processing apparatus selects pixels to restrict color conversion based on color information has been described. However, the method by which the image processing apparatus selects pixels to restrict color conversion is not limited thereto.

According to another embodiment, when the image processing apparatus includes hardware capable of recognizing an object, the image processing apparatus may detect a predetermined object in the input image signal 500. For example, the image processing apparatus may detect a face of a person in the input image signal 500.

Further, the image processing apparatus may select a pixel located in a region where the predetermined object is detected in the detected input image signal 500. The image processing apparatus may maintain the color values of the selected pixels or determine the gain values of the colors of the selected pixels to be a threshold value or within a threshold range. For example, the image processing apparatus may select a pixel positioned in a region where the face of the person is detected in the input image signal 500 to maintain the color values of the selected pixels or determine the gain values of the colors of the selected pixels to be the threshold value or within the threshold range.

Figure 6:
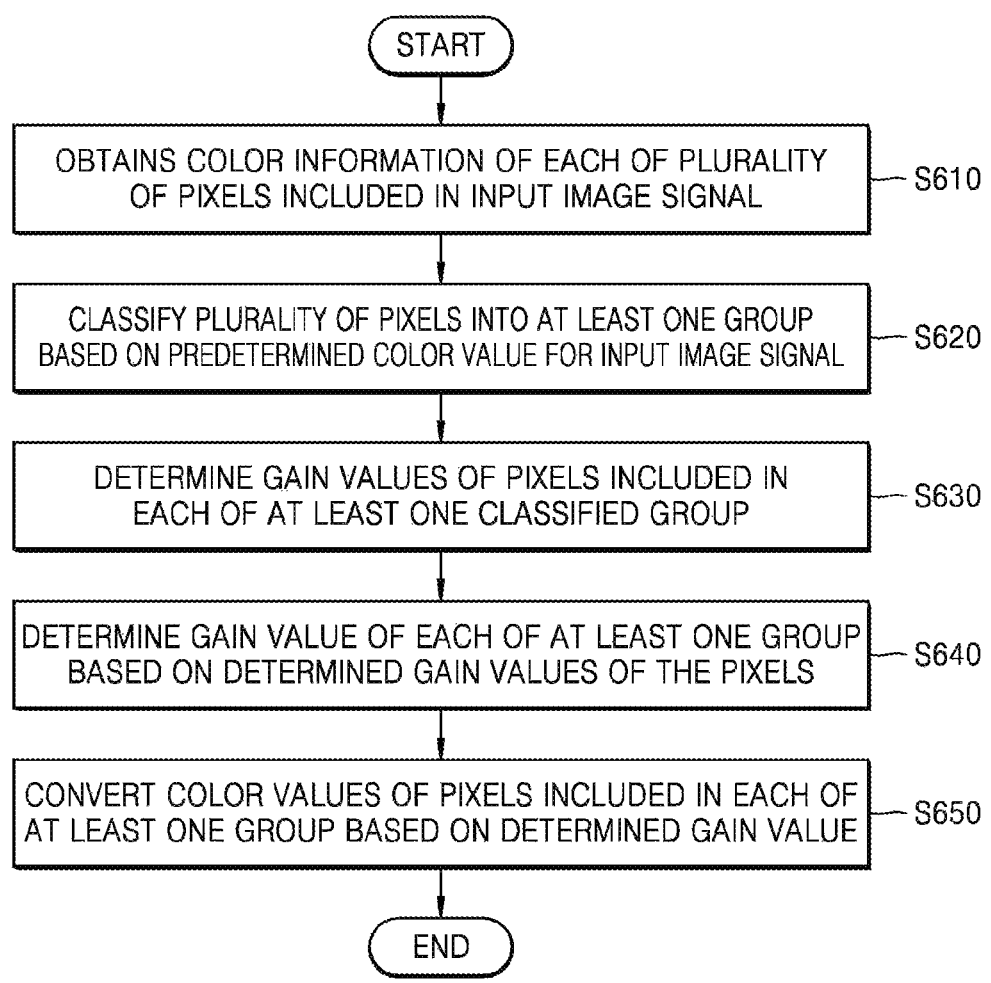
FIG. 6 is a flowchart illustrating a method by which an image processing apparatus converts a color value by classifying a plurality of pixels included in an input image signal into at least one group, according to an embodiment.

FIG. 6 is a flowchart illustrating a method by which an image processing apparatus converts a color value by classifying a plurality of pixels included in an input image signal into at least one group according to an embodiment.

In step S610, the image processing apparatus may obtain color information of each of the plurality of pixels included in the input image signal.

On the other hand, step S610 may correspond to step S210 described above with reference to FIG. 2.

In step S620, the image processing apparatus may classify the plurality of pixels into at least one group based on a predetermined color value for the input image signal. Here, the color value may represent any one of color, saturation, hue, and chrominance (cb, cr).

The image processing apparatus according to an embodiment may previously set a color value as a reference for classifying the plurality of pixels into the at least one group. For example, the image processing apparatus may a hue value of a range corresponding to red, yellow, green, cyan, blue, and magenta to each reference color value. However, this is only an example, and according to another example, the image processing apparatus may classify the plurality of pixels into the at least one group based on a predetermined saturation value.

In step S630, the image processing apparatus may determine gain values of the pixels included in each of the at least one classified group.

The image processing apparatus according to an embodiment may determine a gain value for allowing a color value of each of the pixels included in each of the at least one classified group to correspond to a gamut boundary. For example, the image processing apparatus may determine a gain value of each of a plurality of pixels included in a first group having a hue value corresponding to red.

In step S640, the image processing apparatus may determine a gain value of each of the at least one group based on the determined gain values of the pixels.

The image processing apparatus according to an embodiment may determine the gain value for each of the at least one group based on the determined gain values of the pixels. For example, the image processing apparatus may determine a lowest gain value among the gain values of the pixels included in the group as the gain value of the group.

According to another example, when the number of pixels having a specific color among the pixels included in the group is less than a predetermined number, the image processing apparatus may determine color information of the pixels except for the pixel having the specific color as the gain value of the group. For example, when the number of pixels having a first color in the group is less than the predetermined number, the image processing apparatus may determine the lowest gain value among the gain values of the pixels except for the pixel having the first color as the gain value of the group including the pixels.

According to another example, the image processing apparatus may determine the gain value of the group by applying weights to the gain values of the pixels according to a color distribution of the pixels included in the group.

In step S650, the image processing apparatus may convert the color values of the pixels included in each of the at least one group based on the determined gain value of each of the at least one group.

The image processing apparatus according to an embodiment may convert color values of the pixels by multiplying the color information of the pixels included in each of the at least one group by the gain value of the group including the pixels. For example, the image processing apparatus may convert a color value of each of pixels included in a first group by multiplying color information of each of the pixels included in the first group by a gain value g1.

Figure 7:
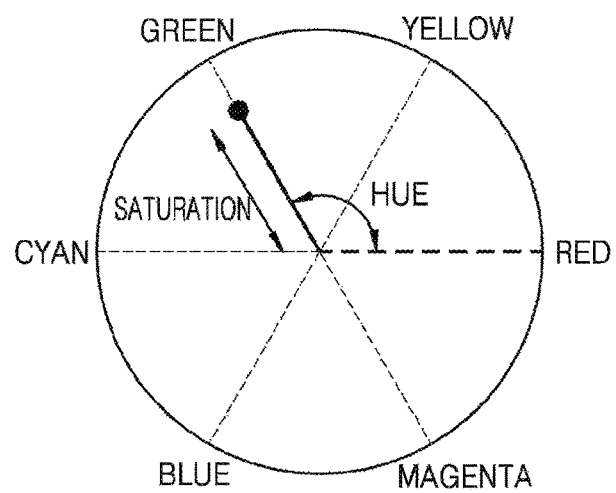
FIG. 7 is a diagram for explaining a reference used by an image processing apparatus to classify a plurality of pixels included in an input image signal into at least one group, according to an embodiment.

FIG. 7 is a diagram for explaining a reference used by an image processing apparatus to classify a plurality of pixels included in an input image signal into at least one group according to an embodiment.

Referring to FIG. 7, the image processing apparatus may classify the plurality of pixels included in the input image signal into the at least one group based on a hue value and a saturation value. For example, the image processing apparatus may the plurality of pixels included in the input image signal into the at least one group based on hue values of six ranges corresponding to red, yellow, green, cyan, blue, and magenta. Further, the image processing apparatus may classify the plurality of pixels into the at least one group based on saturation values of eight ranges.

However, this is only an embodiment, and a color value that is the reference used by the image processing apparatus to classify each of the plurality of pixels is not limited to the hue value and the saturation value. For example, the image processing apparatus may classify each of the plurality of pixels into at least one group according to a color.

Figure 8:
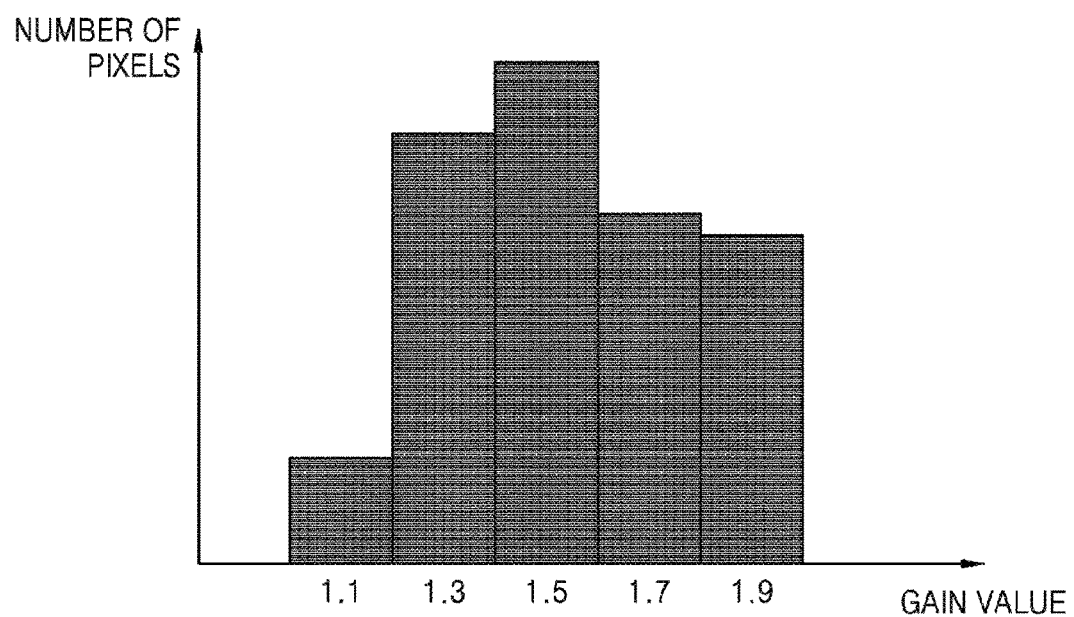
FIG. 8 is a diagram for explaining a method by which an image processing apparatus determines a gain value of each of pixels included in a group, according to an embodiment.

FIG. 8 is a diagram for explaining a method by which an image processing apparatus determines a gain value of each of pixels included in a group according to an embodiment.

The image processing apparatus according to an embodiment may obtain color information of each of a plurality of pixels included in an input image signal. The image processing apparatus may classify the plurality of pixels into at least one group based on the obtained color information.

The image processing apparatus according to an embodiment may determine a gain value of each of the plurality of pixels included in the at least one group. Also, the image processing apparatus may determine a gain value of a group based on the gain value of each of the pixels included in the group. For example, the image processing apparatus may determine a gain value of a first group based on a gain value of each of a plurality of pixels included in the first group having a hue value corresponding to red.

Meanwhile, FIG. 8 shows a distribution according to the gain value of each of the plurality of pixels included in the first group. The image processing apparatus according to the embodiment may determine the gain value of the first group based on gain values except for a gain value having the lowest ratio of the number of pixels among the gain value of each of the plurality of pixels. For example, the image processing apparatus may determine 1.3 that is the lowest gain value among the gain values, except for 1.1 that is a gain value having the lowest ratio of the number of the pixels, as the gain value of the first group.

According to another embodiment, the image processing apparatus may calculate an average value in which a weight is applied to each of a plurality of gain values, in accordance with the ratio of the number of pixels to each of the plurality of gain values. The image processing apparatus may determine the calculated average value as the gain value of the first group.

Figure 9:
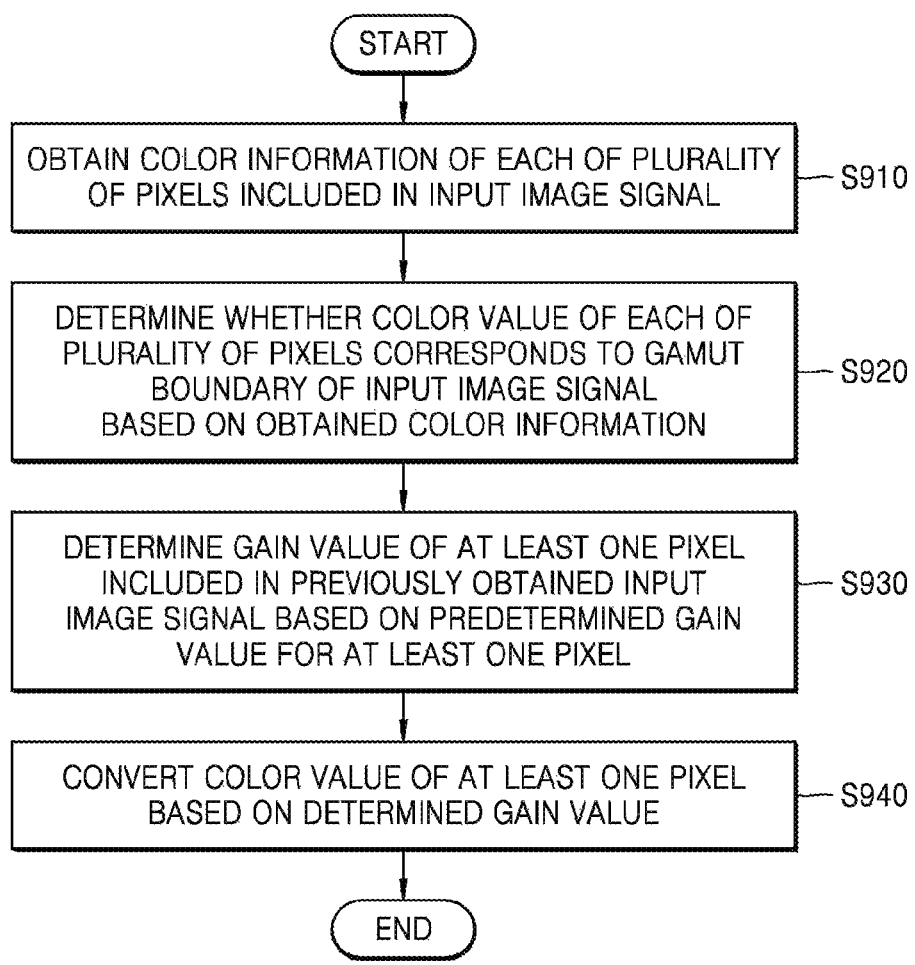
FIG. 9 is a flowchart illustrating a method by which an image processing apparatus determines a gain value of at least one pixel among a plurality of pixels included in an input image signal based on a previously determined gain value, according to an embodiment.

FIG. 9 is a flowchart illustrating a method by which an image processing apparatus determines a gain value of at least one pixel among a plurality of pixels included in an input image signal based on a previously determined gain value according to an embodiment.

In step S910, the image processing apparatus may obtain color information of each of the plurality of pixels included in the input image signal.

On the other hand, step S910 may correspond to step S210 described above with reference to FIG. 2.

In step S920, the image processing apparatus may determine whether a color value of each of the plurality of pixels corresponds to a gamut boundary of the input image signal based on the obtained color information.

The image processing apparatus according to an embodiment may represent the color value of each of the plurality of pixels in coordinates on a color space in which the input image signal is defined based on the obtained color information. The image processing apparatus may determine whether the coordinates of each of the plurality of pixels in the color space are located on the gamut boundary to determine whether the color value of each of the plurality of pixels corresponds to the gamut boundary of the input image signal.

In step S930, the image processing apparatus may determine a gain value of at least one pixel included in a previously obtained input image signal based on a predetermined gain value for the at least one pixel.

The image processing apparatus according to an embodiment may store the gain value for the at least one pixel included in the previously obtained input image signal. The image processing apparatus may determine a gain value of each of the pixels having a specific color among the plurality of pixels based on the gain value determined in the previously obtained input image signal for the specific color. For example, the image processing apparatus may determine a gain value of pixels included in a blue hue range as a predetermined gain value with respect to the pixels included in the blue hue range in the previously obtained input image signal.

In step S940, the image processing apparatus may convert a color value of the at least one pixel based on the determined gain value.

Meanwhile, step S940 may correspond to step S240 described above with reference to FIG. 2.

Figure 10:
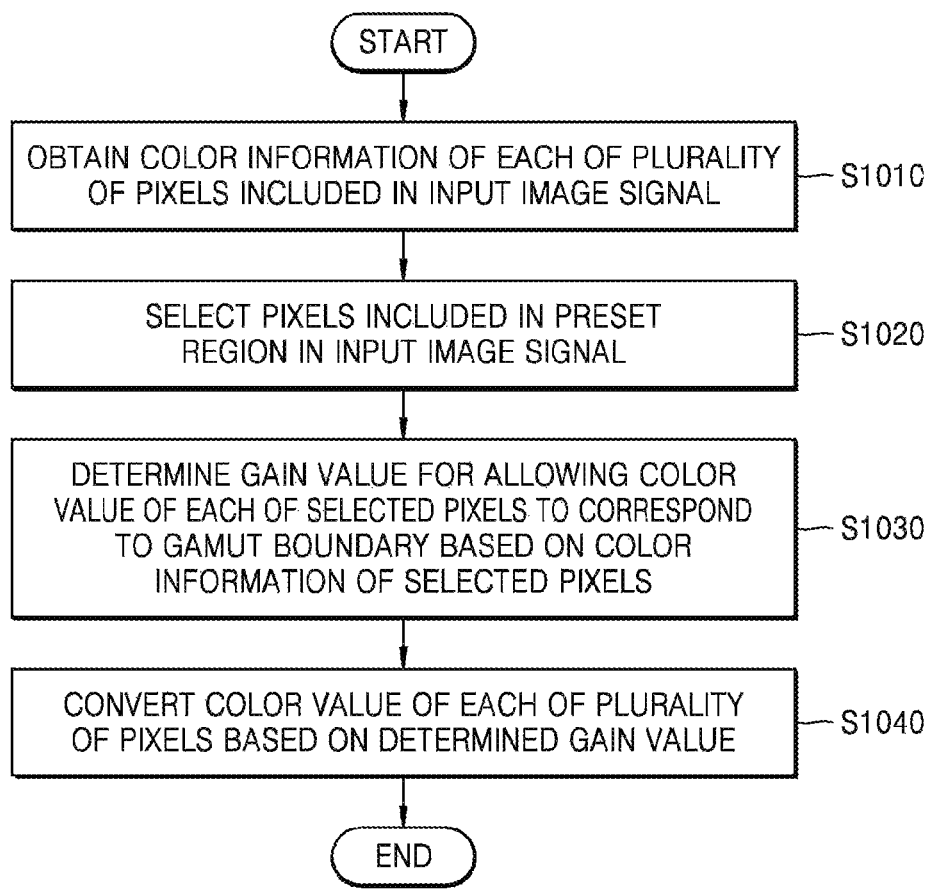
FIG. 10 is a flowchart illustrating a method by which an image processing apparatus determines a gain value based on positions of a plurality of pixels included in an input image signal, according to an embodiment.

FIG. 10 is a flowchart illustrating a method by which an image processing apparatus determines a gain value based on positions of a plurality of pixels included in an input image signal according to an embodiment.

In step S1010, the image processing apparatus may obtain color information of each of the plurality of pixels included in the input image signal.

On the other hand, step S1010 may correspond to step S210 described above with reference to FIG. 2.

In step S1020, the image processing apparatus may select pixels included in a preset region from the plurality of pixels included in the input image signal. Here, the preset region may be a predetermined area on a frame composed of the plurality of pixels included in the input image signal.

For example, the image processing apparatus may select pixels included in a center region on the frame composed of the plurality of pixels included in the input image signal. However, the center region is only an example of the preset region, and the preset region in the disclosed technical idea is not limited to the center region.

In step S1030, the image processing apparatus may determine a gain value for allowing a color value of each of the selected pixels to correspond to a gamut boundary based on the color information of the selected pixels.

The image processing apparatus according to an embodiment may determine a gain value for moving coordinates of each of the selected pixels to the gamut boundary on the color space. The image processing apparatus may determine a more optimized gain value for pixels in the center region by selecting the pixels in the center region having a relatively high interest of a user on the frame composed of the plurality of pixels.

Meanwhile, according to another embodiment, the image processing apparatus may classify the selected pixels into at least one group according to a predetermined color value, and determine a gain value for each of the at least one classified group. Here, the method by which the image processing apparatus determines the gain value for each of the at least one group may correspond to the method described above with reference to FIG. 6.

In step S1040, the image processing apparatus may convert a color value of each of the plurality of pixels based on the determined gain value.

The image processing apparatus according to an embodiment may convert the color value of each of the plurality of pixels by multiplying the color value of each of the plurality of pixels by the gain value determined with respect to the selected pixels.

Figure 11:
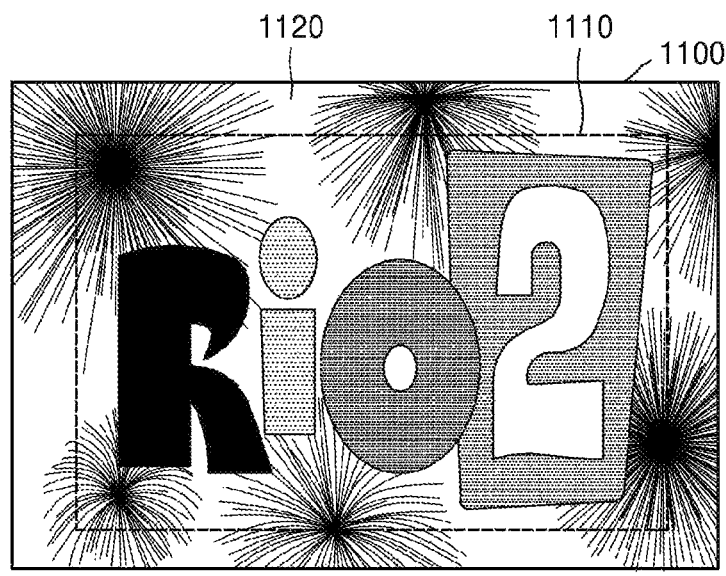
FIG. 11 is a diagram for explaining a method by which an image processing apparatus determines a gain value based on positions of a plurality of pixels included in an input image signal, according to an embodiment.

FIG. 11 is a diagram for explaining a method by which an image processing apparatus determines a gain value based on positions of a plurality of pixels included in an input image signal according to an embodiment.

Referring to FIG. 11, the image processing apparatus may obtain color information of each of the plurality of pixels included in the input image signal.

The image processing apparatus according to an embodiment may select pixels included in a center region 1110 in a frame 1100 composed of the plurality of pixels included in the input image signal.

Also, the image processing apparatus may determine a gain value for allowing a color value of each of the selected pixels to correspond to a gamut boundary. For example, the image processing apparatus may classify the plurality of pixels into groups according to predetermined color values, and determine a gain value for each classified group.

The image processing apparatus according to an embodiment may convert a color value of each of the plurality of pixels based on the determined gain value. For example, when the image processing apparatus determines a gain value of each of pixels classified into a first group as 1.3 according to a color value inside a predetermined region, the image processing apparatus may also determine a gain value of each of pixels located in an outside 1120 of the predetermined region and classified into the first group according to the color value as 1.3.

The image processing apparatus according to an embodiment determines a gain value of each of the pixels of the center region 1110 having a relatively high interest of a user on the frame 1100 composed of the plurality of pixels, thereby determining a more optimized gain value for the pixels of the center region 1110.

Figure 12:
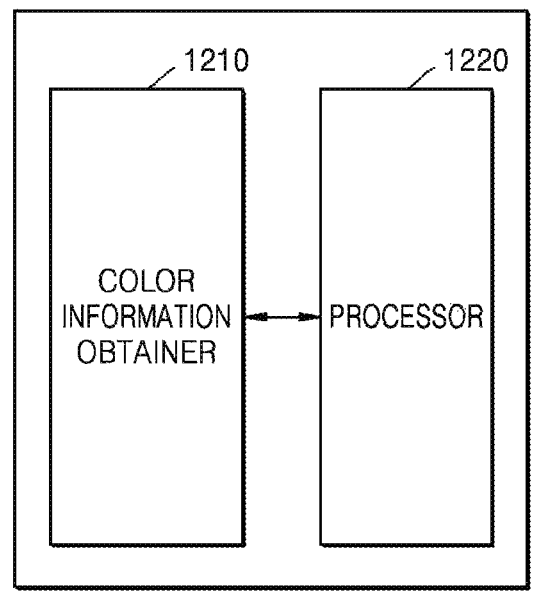
FIGS. 12 and 13 are block diagrams of an image processing apparatus, according to an embodiment.
Figure 13:
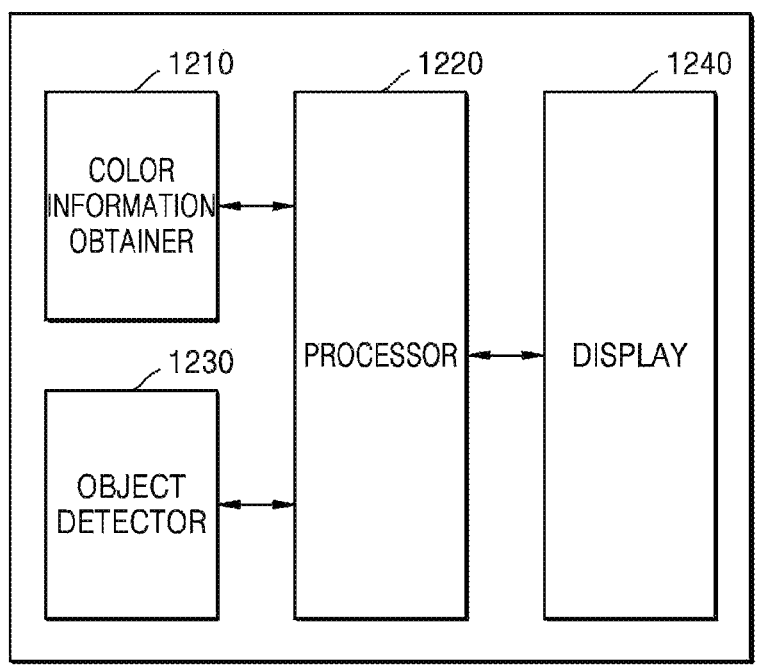

FIGS. 12 and 13 are block diagrams of an image processing apparatus 1200 according to an embodiment.

As shown in FIG. 12, the image processing apparatus 1200 according to an embodiment may include a color information obtainer 1210 and a processor 1220. However, not all illustrated components are indispensable components. The image processing apparatus 1200 may be implemented by a larger number of components than the illustrated components, and the image processing apparatus 1200 may be implemented by fewer components.

For example, as shown in FIG. 13, the image processing apparatus 1200 according to an embodiment may further include an object detector 1230 and a display 1240, in addition to the color information obtainer 1210 and the processor 1220.

The color information obtainer 1210 obtains color information of each of a plurality of pixels included in an input image signal.

The color information obtainer 1210 according to an embodiment may obtain color information including information about at least one of color, hue, saturation, and chrominance (Cb, Cr) of each of the plurality of pixels included in the input image signal.

The processor 1220 determines whether a color value of each of the plurality of pixels corresponds to a gamut boundary of the input image signal based on the color information obtained from the color information obtainer 1210. Further, the processor 1220 determines a gain value for allowing the color value of at least one of the plurality of pixels to correspond to the gamut boundary, based on a determination result. The processor 1220 converts the color value of the at least one pixel based on the determined gain value.

The processor 1220 according to an embodiment may select at least one pixel having a predetermined preservation color among the plurality of pixels based on the obtained color information. Further, the processor 1220 may determine a gain value for allowing the color value of the pixel to correspond to the gamut boundary, except for the selected at least one pixel among the plurality of pixels. Meanwhile, the processor 1220 may determine the gain value of the selected at least one pixel as a predetermined threshold value.

The processor 1220 according to an embodiment may classify the plurality of pixels into at least one group based on a predetermined color value for the input image signal. Further, the processor 1220 may determine the gain value for each of the at least one group based on the color information of the pixels included in the at least one classified group. For example, the processor 1220 may determine the lowest gain value among the gain values of the pixels included in each of the at least one classified group as a gain value of each of the at least one group. According to another example, the processor 1220 may determine a color distribution of the pixels included in each of the at least one group based on the color information of the pixels included in each of the at least one classified group. When the number of pixels having a first color is less than a predetermined number, the processor 1220 may determine, based on the determined color distribution, may determine the gain value for each of the at least one group based on the color information of the pixels except for the pixels having the first color among the plurality of pixels.

The processor 1220 according to an embodiment may select pixels included in a predetermined region of the input image signal. The processor 1220 may also determine a gain value for allowing the color value of each of the selected pixels to correspond to the gamut boundary based on the color information of the selected pixels.

The processor 1220 according to an embodiment may determine a gain value of at least one pixel included in a previously obtained input image signal based on a predetermined gain value for the at least one pixel.

The processor 1220 according to an embodiment may select a pixel corresponding to a position of a predetermined object in the input image signal. Further, the processor 1220 may determine a gain value for allowing the color value of the pixel except for the selected at least one pixel among the plurality of pixels to correspond to the gamut boundary.

The object detector 1230 may detect a predetermined object in the input image signal. For example, the object detector 1230 may detect a face of a person in the input image signal.

The display 1240 may display the obtained image signal on the image processing apparatus 1200. For example, the display 1240 may display the input image signal converted based on the gain value determined in the processor 1220.

An apparatus according to the embodiments may include a processor, a memory storing and executing program data, a permanent storage such as a disk drive, a communication port for communication with an external device, a user interface device such as a touch panel, keys or buttons, and the like. The computer-readable recording medium may also be distributed over network-coupled computer systems so that the computer readable code is stored and executed in a distributed fashion. The medium may be read by a computer, stored in a memory, and executed by the processor.

All references, including publications, patent applications, and patents, cited herein are hereby incorporated by reference to the same extent as if each reference were individually and specifically indicated to be incorporated by reference and were set forth in its entirety herein.

To promote understanding of one or more embodiments, reference has been made to the embodiments illustrated in the drawings, and specific language has been used to describe these embodiments. However, no limitation of the scope of the present disclosure is intended by this specific language, and embodiments should be construed to encompass all embodiments that would normally occur to one of ordinary skill in the art.

The embodiments may be embodied as functional blocks and various processing operations. The functional blocks may be implemented with various hardware and/or software configurations executing specific functions. For example, the embodiments employs integrated circuit configurations such as a memory, processing, logic, a look-up table and the like capable of executing various functions upon control of microprocessors or other control devices. In a similar manner to that in which the elements of the present disclosure may be executed with software programming or software elements, the embodiments may be implemented with a scripting language or a programming language such as C, C++, Java, assembler, and the like, including various algorithms implemented by a combination of data structures, processes, processes, routines or other programming configurations. The functional aspects may be implemented by algorithms executed in one or more processors. Also, the present disclosure may employ conversional arts to establish an electronic environment, process signals and/or process data. The terms "mechanism", "element", "means" and "configuration" may be widely used and are not limited to mechanical and physical configurations. Such terms may have the meaning of a series of routines of software in association with a processor or the like.

Specific executions described herein are merely examples and do not limit the scope of the present disclosure in any way. For simplicity of description, other functional aspects of conventional electronic configurations, control systems, software and the systems may be omitted. Furthermore, line connections or connection members between elements depicted in the drawings represent functional connections and/or physical or circuit connections by way of example, and in actual applications, they may be replaced or embodied as various additional functional connection, physical connection or circuit connections. Also, the described elements may not be inevitably required elements for the application of the present disclosure unless they are specifically mentioned as being "essential" or "critical."

The invention claimed is:

1. An image processing method comprising:
   obtaining color information of each of a plurality of pixels included in an input image signal;
   determining whether a color value of each of the plurality of pixels corresponds to a gamut boundary of the input image signal based on the obtained color information;
   determining whether a color value of at least one pixel, that is determined to not correspond to the gamut boundary, is included in a preset preservation color; and
   converting the color value of the at least one pixel according to a gain value determined based on whether the color value of the at least one pixel is included in the preset preservation color,
   wherein a gain value of a first pixel among the at least one pixel, that has a color value that is included in the preset preservation color, is determined as a threshold value preset to the preservation color,
   wherein a gain value of a second pixel among the at least one pixel, that has a color value that is not included in the preset preservation color, is determined as a value for allowing the color value to correspond to the gamut boundary, and
   wherein a threshold value for each of a plurality of preservation colors is set differently.

2. The image processing method of claim 1, further comprising: selecting at least one pixel having the preset preservation color from the plurality of pixels based on the obtained color information.

3. The image processing method of claim 1, further comprising: classifying the plurality of pixels into at least one group based on a preset color value with respect to the input image signal,
wherein the gain value of the second pixel is determined with respect to each of the at least one group based on the color information of the pixels included in the at least one classified group.

4. The image processing method of claim 1, further comprising: selecting the pixels included in a preset region from the input image signal,
wherein the gain value of the second pixel is determined based on the color information of the selected pixels.

5. The image processing method of claim 1, wherein the gain value of the second pixel is determined based on a predetermined gain value with respect to at least one pixel included in a previously obtained input image signal.

6. The image processing method of claim 1, further comprising:
detecting a preset object from the input image signal; and
selecting a pixel corresponding to a position of the detected preset object,
wherein a gain value of a third pixel among the at least one pixel except for the selected pixel, that has a color value that is not included in the preset preservation color, is determined as a value for allowing the color value to correspond to the gamut boundary.

7. A non-transitory computer readable recording medium having recorded thereon a program for implementing the image processing method of claim 1, by using a computer.

8. An image processing apparatus comprising:
at least one processor configured to obtain color information of each of a plurality of pixels included in an input image signal,
to determine whether a color value of each of the plurality of pixels corresponds to a gamut boundary of the input image signal based on the obtained color information,
to determine whether a color value of at least one pixel, that is determined not to correspond to the gamut boundary, is included in a preset preservation color, and
to convert the color value of the at least one pixel according to a gain value determined based on whether the color value of the at least one pixel is included in the preset preservation color,
wherein a gain value of a first pixel among the at least one pixel, that has a color value that is included in the preset preservation color, is determined as a threshold value preset to the preservation color,
wherein a gain value of a second pixel among the at least one pixel, that has a color value that is not included in the preset preservation color, is determined as a value for allowing the color value to correspond to the gamut boundary, and
wherein a threshold value for each of a plurality of preservation colors is set differently.

9. The image processing apparatus of claim 8, wherein the at least one processor is further configured to select at least one pixel having the preset preservation color from the plurality of pixels based on the obtained color information.

10. The image processing apparatus of claim 8, wherein the at least one processor is further configured to classify the plurality of pixels into at least one group based on a preset color value with respect to the input image signal, and determine the gain value of the second pixel with respect to each of the at least one group based on the color information of the pixels included in the at least one classified group.

11. The image processing apparatus of claim 8, wherein the at least one processor is further configured to select the pixels included in a preset region from the input image signal, and determine the gain value of the second pixel based on the color information of the selected pixels.

12. The image processing apparatus of claim 8, wherein the at least one processor is further configured to determine the gain value of the second pixel based on a predetermined gain value with respect to at least one pixel included in a previously obtained input image signal.

13. The image processing apparatus of claim 8, wherein the at least one processor is further configured to detect a preset object from the input image signal,
to select a pixel corresponding to a position of the detected preset object, and to determine a gain value of a third pixel among the at least one pixel except for the selected pixel, that has a color value that is is not included in the preset preservation color, for allowing the color value to correspond to the gamut boundary.

* * * * *